United States Patent [19]

Yoo

[11] Patent Number: 5,052,429

[45] Date of Patent: Oct. 1, 1991

[54] GAS BREAKER, AUTOMATIC GAS SHUT-OFF VALVE

[76] Inventor: Keun Young Yoo, Postmaster, LaCañada Flintridge, Calif. 91011

[21] Appl. No.: 574,503

[22] Filed: Aug. 24, 1990

Related U.S. Application Data

[63] Continuation-in-part of Ser. No. 449,978, Nov. 13, 1989, abandoned.

[51] Int. Cl.$^5$ .............................................. F16K 17/36
[52] U.S. Cl. ......................................... 137/38; 251/65
[58] Field of Search .............................. 137/38; 25/65

[56] References Cited

U.S. PATENT DOCUMENTS

| | | | |
|---|---|---|---|
| 2,585,316 | 2/1952 | Hobson | 137/38 |
| 3,747,616 | 7/1973 | Lloyd | 137/38 |
| 4,382,449 | 5/1983 | Nelson | 137/38 |
| 4,485,832 | 12/1984 | Plemmons | 137/38 |
| 4,565,208 | 1/1986 | Ritchie | 137/38 |
| 4,715,394 | 12/1987 | O'Donnell | 137/38 |
| 4,785,842 | 11/1988 | Johnson | 137/38 |

FOREIGN PATENT DOCUMENTS

| | | | |
|---|---|---|---|
| 51179 | 4/1980 | Japan | 137/38 |
| 12172 | 1/1982 | Japan | 137/38 |

Primary Examiner—Robert G. Nilson
Attorney, Agent, or Firm—William H. Maxwell

[57] ABSTRACT

A gas flow shut-off valve that senses seismic motion inducing oscillating ball movement in a concave dish of a lateral valve chamber. When the intensity of seismic shaking reaches a destructive level, the ball valve is dislodged from the dish into a valve seat, thus blocking the gas flow passage through the valve. The tripped ball is reset from outside the valve by using a strong magnet to retrieve the ball from the valve seat and back to the dish.

8 Claims, 2 Drawing Sheets

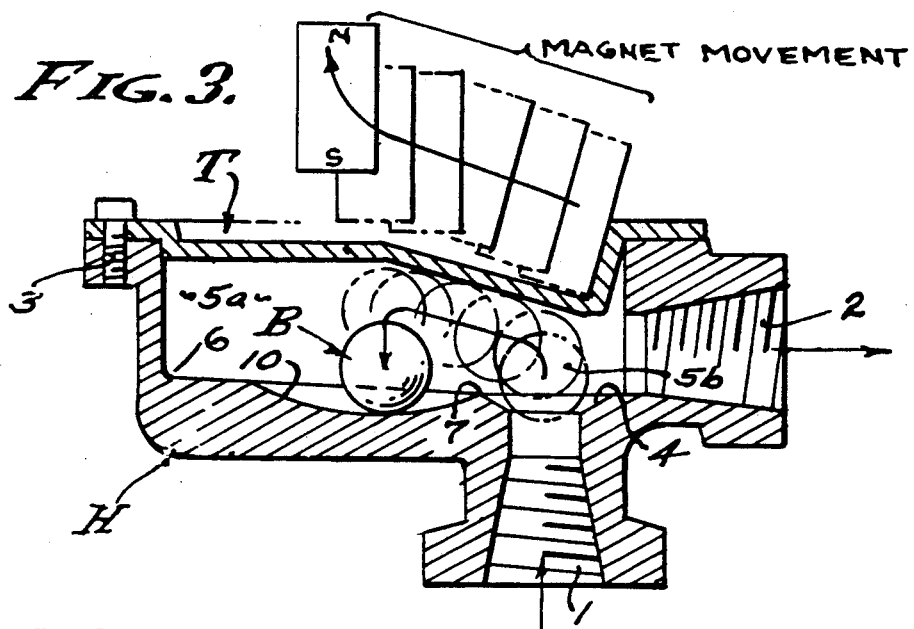
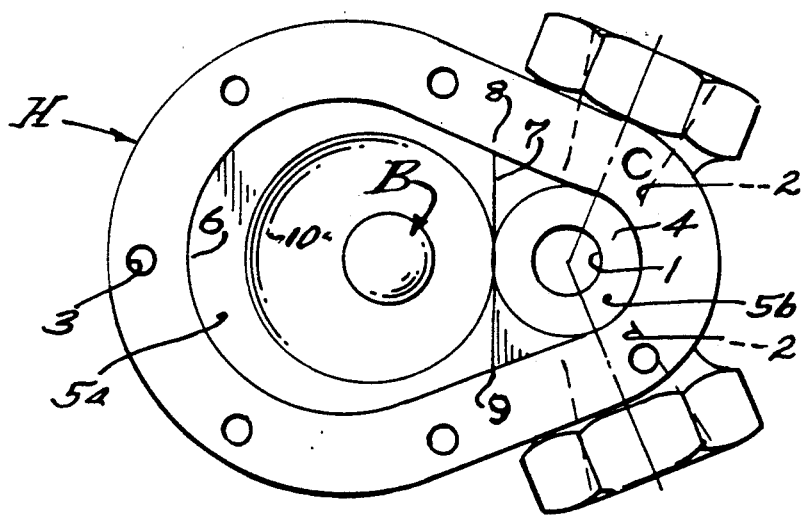
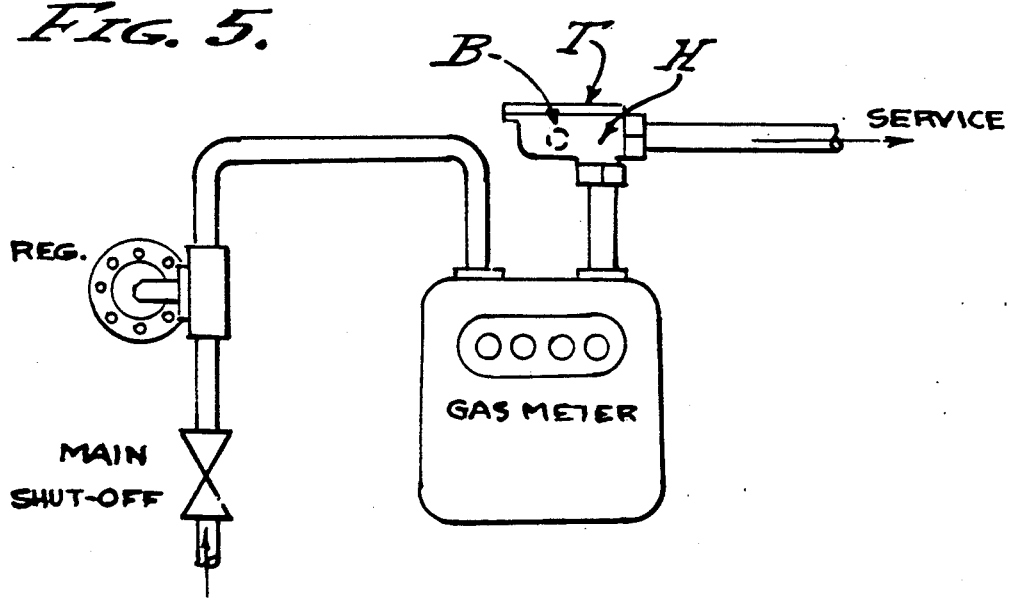

GAS BREAKER, AUTOMATIC GAS SHUT-OFF VALVE

This application is a continuation-in-part of application Ser. No. 07/449,978 filed Nov. 13, 1989.

FIELD OF THE INVENTION

This invention relates to a gravity operated gas shut-off valve which automatically shuts off flow of a flammable gas supply in response to violent seismic motion.

BACKGROUND OF THE INVENTION

There have been a number of gravity operated shut-off valves designed and proposed. A ball valve is the commonly used tripping and flow blocking device. Since many designs rely their operations in positioning stability of the ball valve on a narrow pedestal or a grooved track, precise levelling of the valve installation is extremely critical. Therefore, either nuisance tripping or no-sensing condition of the valves are caused frequently by even minor levelling errors. Also some of the shut-off valves in the prior art hardly distinguish seismic shaking from the vibrations in the surrounding such as rattling from a passing car. This could cause occasional false tripping of the valve. In reviewing reset methods of the valves, mechanical resetting elements that penetrate the valve body often pose potential pressure leakage or malfunction in and around penetration points of the devices. Permanent magnets are often used to keep the sensing elements in ready position, with resetting means operable after the tripping. However, keeping the magnet as a resident member of the apparatus leaves room for vandalism and misuse.

It is the objective of this invention to significantly improve the reliability and integrity of the prior art, and resolve the problems of screening out non-seismic vibrations by introducing a free-rolling ball in a concave dish.

The most pertinent prior art is listed and reviewed, as follows:

U.S. Pat. No. 4,485,832 to Plemmons for an Automatic Gas Shut-Off Valve shows a ball valve on a circular channel and use of a reset rod.

U.S. Pat. No. 4,565,208 to Ritchie for a Seismic Shut-Off Valve shows multiple ball valves on a circular groove with a deflector. A reset rod is sued.

U.S. Pat. No. 3,747,616 to Floyd for an Earthquake Sensitive Shut-Off Valve shows a ball valve sitting in a saddle which is formed by inclined planes with a reset means that requires either opening of the valve or penetration through the valve body.

U.S. Pat. No. 4,715,394 to O'Donnell for a Gas Supply Safety Valve for Earthquake Protection shows a multi-axial grooved pedestal and a ball valve with a plunger type reset element.

U.S. Pat. No. 4,382,499 to Nelson for a Magnetically Resettable Emergency Shut-Off Valve shows a permanent magnet keeping a ball valve afloat and reset after tripping. This patent also intends to be more sensitive to vertical shock waves near an epicenter. The magnet is a resident element of the valve.

U.S. Pat. No. 4,785,842 to Johnson, Jr. for a Resettable Vibration-Actuated Emergency Shut-Off Mechanism shows a permanent magnet to keep the valve weight afloat and to adjust sensitivity.

Japan Patent No. 57-12,172 to Yagi for an Automatic Gas Shut-Off Device shows the use of a permanent magnet to keep the ball valve afloat and also to pickit up for a reset. The magnet stays as a permanent element of the valve.

SUMMARY OF THE INVENTION

An object of this invention is to provide a reliable means of automatic gas shut-off in the event of a severe earthquake, with improvements and advantages in the following criteria:

A valve that is responsive to the seismic motions which have typically low in cycle frequencies and unique horizontal acceleration. This invention uses a free-rolling ball valve oscillation in a concave dish of a valve chamber to reduce the chance of triggering from non-seismic motions, such as vibrations created by passing trucks.

A valve that is functionally acceptable with minor levelling deviations which could occur during the length of its service life. This invention uses a spherically concaved dish in which the ball valve is stable by self-positioning during normal operation.

A valve that is easily reset without posing any potential pressure leakage from the valve system. This invention uses a magnet from outside the valve body to retrieve the ball valve magnetically back to a reset location. There is no mechanical penetration point which could jeopardize the integrity of the pressure boundary. After each reset, the magnet is stored away safely preventing any vandalism or misuse.

The device is easily installed with the existing plumbing as well as in a new construction application. The device is designed and dimensioned such that it will replace existing elbows, downstream from a gas meter.

The foregoing and various other objects and features of this invention will be apparent and fully understood from the following detailed description of the typical preferred forms and application thereof, throughout which description reference is made to the accompanying drawings.

THE DRAWINGS

FIG. 3 is a multi-position view, similar to FIG. 2, showing the reset operation applied to the ball valve.

FIG. 4 is a top view of an alternate embodiment configuration of the Gas Breaker where a Tee connection is desired.

FIG. 5 is a typical installation diagram where a standard elbow is replaced by a Gas Breaker of the present invention.

THE PREFERRED EMBODIMENT

Figure 1:
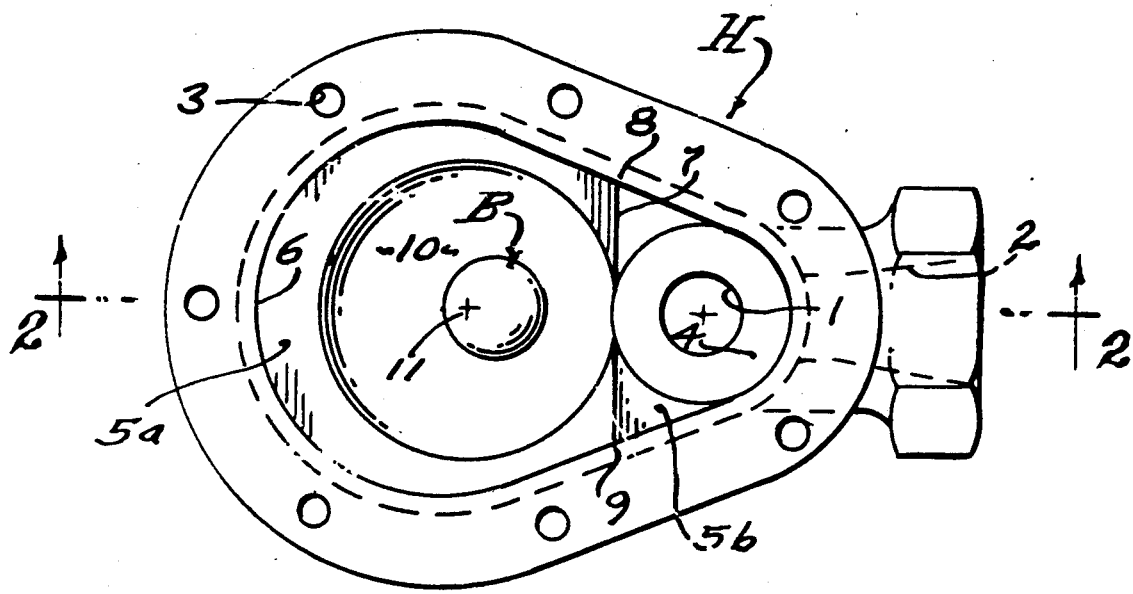
FIG. 1 is a top view of the Gas Breaker Earthquake Activated Automatic Gas Shut-Off Valve, with the valve cover removed.
Figure 2:
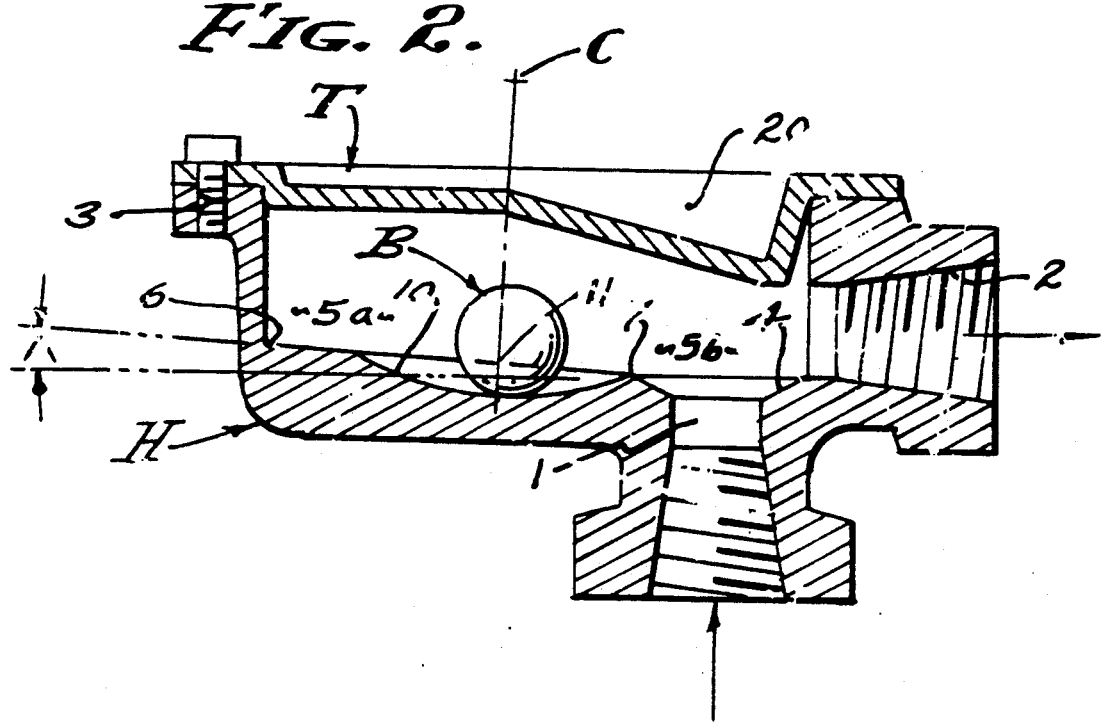
FIG. 2 is a cross sectional view with the valve cover installed, being taken by line 2—2 in FIG. 1.

Referring now to FIGS. 1 and 2 of the drawings, the Gas Breaker is comprised generally of three major elements: a valve body H, a valve cover T, and a ball valve B.

The valve body H which houses a ball valve during the normally open condition is the main structure of the valve and is made of a non-ferromagnetic material such as bronze, brass, aluminum or one of the alloys of the similar material. The valve body H has a vertical inlet port 1 and a horizontal outlet port 2. The top of the valve body H is horizontally flanged where threaded holes 3 are equally spaced for the valve cover screw mounting. The valve body H has two adjoining partially cylindrical lateral chamber areas, marked 5a and 5b in FIG. 1. The larger chamber area 5a is called a cradle area, and it has a cast flat bottom slightly angled downward from point 6 to point or line 7, approximately four to six degrees as marked A in FIG. 2. The smaller chamber area 5b is called a valve seat area, and is concentric to the opening of the inlet port 1. The bottom of the seat area 5b is cast flat and perpendicular to the centerline of the vertical port 1. These two bottom planes of areas 5a and 5b join at the straight line 7 connecting between point 8 and point 9. The approximate center of the cradle area flat plane is machined concave providing a ball valve resting dish 10. This shallow spherically concave dish 10 is centered at point C, as shown in FIG. 2. The spherical center C of the dish is perpendicular to the cradle area flat at point 11, a shown in FIG. 2. The perimeter of the concave dish 10 joins tangent with the line 7 connecting points 8 and 9. Therefore, the dish is surrounded by the slightly angled flat cast surface after the spherical cut-away machining. This geometric configuration makes the lowest point of the dish perimeter at the tangent point with the line 7. The dish surface is finished smooth to minimize rolling friction of the ball valve B, the operation of which will be later described. The flat bottom of the seat area 5b is machined flare downward, concentric to the vertical port 1 opening.

The valve cover T is best shown in FIG. 2, and is made of the same material as the valve body H, so as to establish a valve chamber by being mounted to the valve body with screws. A gasket is placed between the valve and the cover T to ensure a positive seal. The cover T is partially formed to an angled recess 20, as shown in FIG. 2, above the valve seat area 5b to permit magnetic access to the ball valve B during the reset operation.

The ball valve B is a full spherical ball made of ferromagnetic material and its diameter is slightly larger than the opening diameter of the vertical port 1 at the valve seat 4.

FIG. 5 shows a typical installation of the Gas Breaker shut-off valve is mounted horizontally level as an elbow, downstream from a gas meter.

In reviewing the operation of this valve, in a normal open position of the valve, the ball valve B rests at the lowest point in the concave dish 10, allowing gas passage from the inlet port 1 to the outlet port 2. When seismic motion is applied to the valve, the ball valve B starts its rolling oscillation inside the dish in relation to the directions of the force. When the intensity of the seismic motion reaches the designed tripping threshold, the oscillating ball valve is dislodged over the line 7 and to the seat area 5b and onto the seat 4. The slight tilt of the concave dish 10 and the similar slope of the cradle area 5a flat surrounding the dish, with help of momentum of ball valve oscillation, will induce any directional displacement of the ball valve into the seat area 5b. Once the ball valve is dislodged over the line 7 the flared slope will guide the ball valve to the opening of the valve seat 4, blocking the flow of gas. The ball valve B remains in the valve seat until it is manually reset.

The ball valve B reset is accomplished by one of the following operational methods: One method is to open the valve cover by disassembling the mounting screws and then manually retrieving the ball B and moving it to the concave dish 10. This method is neither desirable nor recommended as it breaks the pressure boundary during reset. Ther recommended method is to reset magnetically by the end user or service technician supplied with a strong round bar magnet such as a Neodymium magnet, by positioning the magnet directly over the valve cover above the tripped ball valve so as to retrieve and pick up the ball from the valve seat and then carefully direct it along the cover to the dish 10 of the valve body, and then release the ball valve by moving the magnet away from the valve cover. This reset operation, as shown in FIG. 3, is done without opening or disassembling the Gas Breaker. The latter procedure is simple, safe and reliable. Once the reset is completed, the magnet is stored away safely, preventing any vandalism or misuse.

The FIG. 4 embodiment shows an alternate configuration of the Gas Breaker Shut-Off Vave, wherein there is one additional outlet port to serve the function of a tee connection. In some localities, utility companies install Tees in place of elbows for temporary gas supply during maintenance operations. The Gas Breaker Shut-Off Valve configuration shown in FIG. 4 functions the same way as that in FIG. 1, except that one unused horizontal port is plugged at the time of installation.

Having described only the typical preferred forms and applications of my invention, I do not wish to be limited or restricted to the specific details herein set forth, but wish to reserve to myself any modifications or variations that may appear to those skilled in the art as set forth within the limits of the following claims.

I claim:

1. A normally open earthquake actuated shut-off valve having at least one vertically arranged inlet port and one outlet port, the two ports being open into a valve chamber configured laterally of said inlet port and comprising:
   a flat bottom surface tilted slightly downward toward said inlet port, said surface being provided with a shallow concave dish portion;
   a gravity operated ball positioned within the dish portion and free to roll in any direction in response to seismic motion;
   and a valve seat associated with said inlet port and adapted to be closed by the gravity operated ball to shut off fluid flow.

2. The shut-off valve as set forth in claim 1, wherein the ball is made of ferromagnetic material, and a magnet is provided to retrieve and reset the ball from the valve seat to the concave dish portion.

3. The shut-off valve as set forth in claim 2, having a valve cover with a sectional profile which is angle recessed above the valve seat area to permit a reset magnet to closely approach the ball.

4. A normally open earthquake actuated shut-off valve, including:
   a vertically disposed inlet port and an outlet port opening into a laterally disposed valve chamber having a cradle area with a bottom tilted downward and having a flat valve seat area with a substantially horizontal bottom, said bottoms continuing one into the other at a line of joinder;
   the bottom of the cradle area being provided with a shallow concave dish portion;
   a gravity operated ball valve normally positioned within the dish portion and free to roll in any direction therein in response to seismic motion;
   the bottom of the valve seat area being provided with a valve seat surrounding the vertically disposed inlet port and adapted to be closed by the ball valve rolling free of the dish portion and onto said seat to shut off the inlet port.

5. The shut-off valve as set forth in claim 4, wherein the valve seat is downwardly flared surrounding the vertically disposed inlet port.

6. The shut-off valve as set forth in claim 4, wherein the ball valve is made of ferromagnetic material, and wherein a magnet is movable outside the valve chamber to retrieve the ball valve from said seat to said dish portion of the valve chamber.

7. The shut-off valve as set forth in claim 4, wherein the ball valve is made of ferromagnetic material and a cover over the valve chamber is made of nonferromagnetic material, and wherein a magnet is movable over the outside of the cover to retrieve the ball valve from said outlet port to said dish portion of the valve chamber.

8. The shut-off valve as set forth in claim 4, wherein the ball valve is made of ferromagnetic material, wherein a cover closing the valve chamber is downwardly recessed from the cradle area to the valve seat area and closely over the ball valve, and wherein a magnet is movable over the outside of the cover and into the recess to retrieve the ball valve from said inlet port to said dish portion of the valve chamber.

* * * * *